US008971786B2

(12) United States Patent
Campanini

(10) Patent No.: US 8,971,786 B2
(45) Date of Patent: Mar. 3, 2015

(54) TICKET PRINTER

(75) Inventor: Alberto Campanini, Fidenza (IT)

(73) Assignee: Custom Engineering S.p.A. (IT)

( * ) Notice: Subject to any disclaimer, the term of this patent is extended or adjusted under 35 U.S.C. 154(b) by 0 days.

(21) Appl. No.: 13/979,164

(22) PCT Filed: Jan. 10, 2012

(86) PCT No.: PCT/IB2012/050124
§ 371 (c)(1),
(2), (4) Date: Sep. 27, 2013

(87) PCT Pub. No.: WO2012/101534
PCT Pub. Date: Aug. 2, 2012

(65) Prior Publication Data

US 2014/0026812 A1 Jan. 30, 2014

(30) Foreign Application Priority Data

Jan. 28, 2011 (IT) ............................ MO2011A0012

(51) Int. Cl.
*G03B 15/00* (2006.01)
*B41J 11/00* (2006.01)

(52) U.S. Cl.
CPC .................................. *B41J 11/0095* (2013.01)
USPC .......................................... 399/385; 399/371

(58) Field of Classification Search
CPC .................................................. B41J 11/0095
USPC ................................................ 399/371, 385
See application file for complete search history.

(56) References Cited

U.S. PATENT DOCUMENTS

| | | | | |
|---|---|---|---|---|
| 4,975,571 | A * | 12/1990 | McMurtry et al. | 250/231.16 |
| 6,929,417 | B2 | 8/2005 | Boudreau | |
| 2005/0201808 | A1* | 9/2005 | Barry et al. | 400/679 |
| 2006/0227200 | A1 | 10/2006 | Rehmann | |

FOREIGN PATENT DOCUMENTS

| | | | |
|---|---|---|---|
| JP | 2002361959 | A | 12/2002 |
| JP | 2003097910 | A | 4/2003 |
| JP | 2006043921 | A | 2/2006 |

* cited by examiner

*Primary Examiner* — Rodney Fuller
(74) *Attorney, Agent, or Firm* — Laubscher, Spendlove & Laubscher, P.C.

(57) ABSTRACT

In a ticket printer, an end of a paper sensor has an optic emitter and receiver arranged one after the other in the paper advancement direction and operationally connected together via a signal guide. The emitter and the receiver are arranged on one side of the path of the paper whereas the signal guide is arranged on the opposite side.

12 Claims, 2 Drawing Sheets

TICKET PRINTER

This application is a §371 National Stage Entry of PCT International Application No. PCT/IB2012/050124 filed Jan. 10, 2012. PCT/IB2012/050124 claims priority to IT Application No. IT-MO2011A000012 filed Jan. 28, 2011. The entire contents of these applications are incorporated herein by reference.

BACKGROUND OF THE INVENTION

The invention relates to a ticket printer, in particular for tickets of paper or cardboard or of material that is similar to paper or cardboard.

In particular, reference is made to a ticket printer provided with a system that is able to detect the absence of the support (paper or cardboard) on which to print.

Specifically, but not exclusively, the invention can be used for printing on a support formed by a continuous strip (for example of paper or cardboard) having in set zones holes or notches, such as, for example holes or notches obtained by die-cutting.

The prior art already comprises ticket printers, such as, for example, those shown in patent publications U.S. Pat. No. 6,929,417 and JP 2002361959.

Ticket printers are known in which a sensor (end of paper sensor) sends a signal indicating the presence or absence of the printing support (paper or cardboard). The signal is in general used by the control unit of the printer to avoid printing in the absence of the printing support and/or to indicate the need for a new supply of printing support.

One known presence or end of paper sensor comprises an optic sensor having a signal emitter and receiver arranged on the two opposite sides of a paper path along which the paper is moved by a dragging device. The presence of the paper hinders reception of the emitted optic signal whereas in the absence of paper the emitted signal can be received.

Another known presence or end of paper sensor comprises a reflective optic sensor having a signal emitter and receiver arranged on the same side of the paper path, so in presence of paper the emitted signal can be received through the effect of the reflection on the paper, whereas in the absence of paper the emitted signal is not received because it is not reflected.

If a continuous strip of paper with holes or notches is supplied along the paper path there is the risk of a false end of paper signal due to the transit of a gap (hole or notch) in the detecting zone in which the optic sensor operates.

Another problem, which is typical of reflection sensors, is the risk of a false end of paper signal due to the transit of an area that is black in colour (or has low reflective capacity) of the paper in the detecting zone in which the optic sensor operates.

US 2006/0227200 describes a printer as in the preamble of claim 1.

SUMMARY OF THE INVENTION

One aim of the invention is to make a printer that is able to detect with efficacy and reliability the presence or absence of the printing support.

One advantage is to avoid false end of paper signals due to the transit of a hole or notch in the detecting zone in which the paper-finished sensor operates.

One advantage is to avoid false end of paper signals due to the transit of an area of paper with low reflective capacity in the zone in which the end of paper sensor operates.

One advantage is to make available a ticket printer having a simple and cheap end of paper detection system.

Such objects and advantages, and still others, are achieved by the printer according to one or more of the claims set out below.

According to an embodiment, a printer has an end of paper sensor having an emitter and receiver arranged one after the other in the paper advancement direction and operationally connected together via a signal guide, in which the emitter and the receiver are arranged on a side of the path of the paper whereas the signal guide is arranged on the opposite side.

BRIEF DESCRIPTION OF THE DRAWINGS

The invention can be better understood and implemented with reference to the attached drawings that illustrate an embodiment thereof by way of non-limiting example.

DETAILED DESCRIPTION

Figure 1:
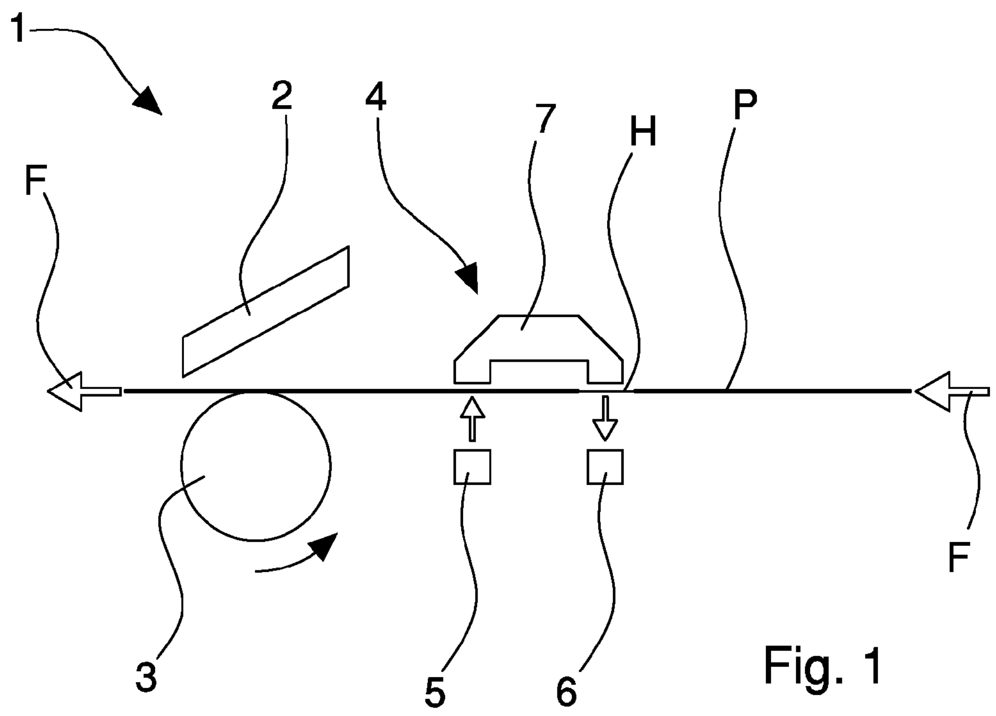
FIG. 1 is a diagram of a ticket printer according to the invention.
Figure 3:
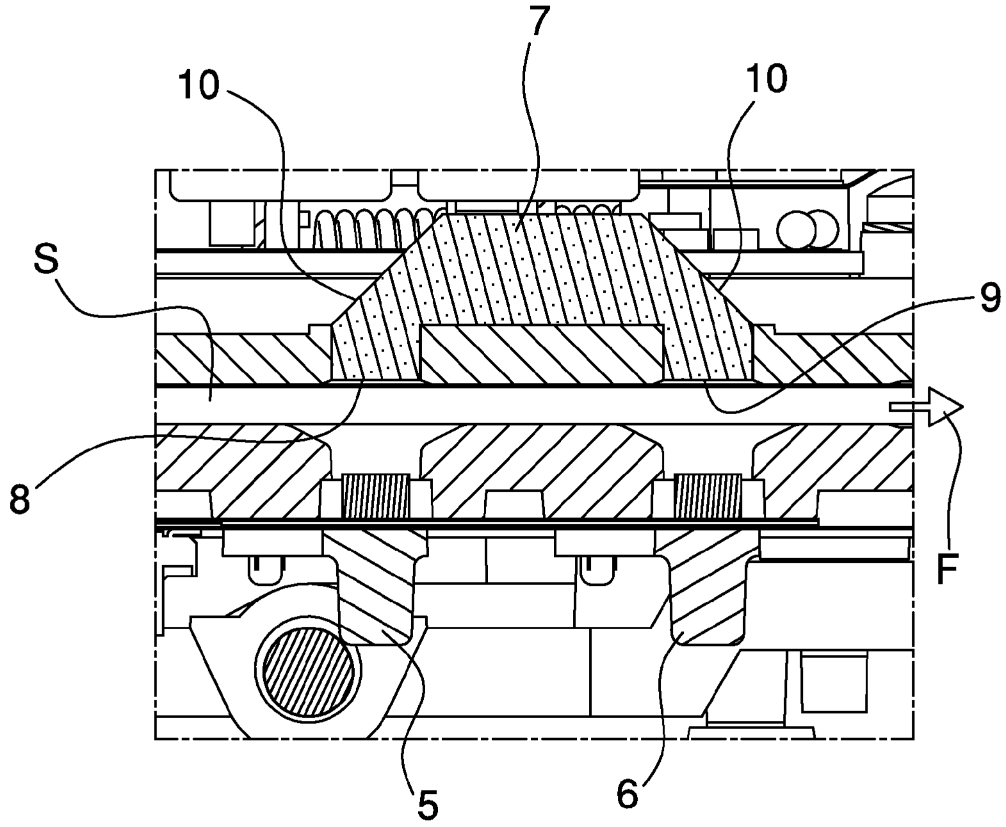
FIG. 3 is an enlarged detail of FIG. 2.
Figure 2:
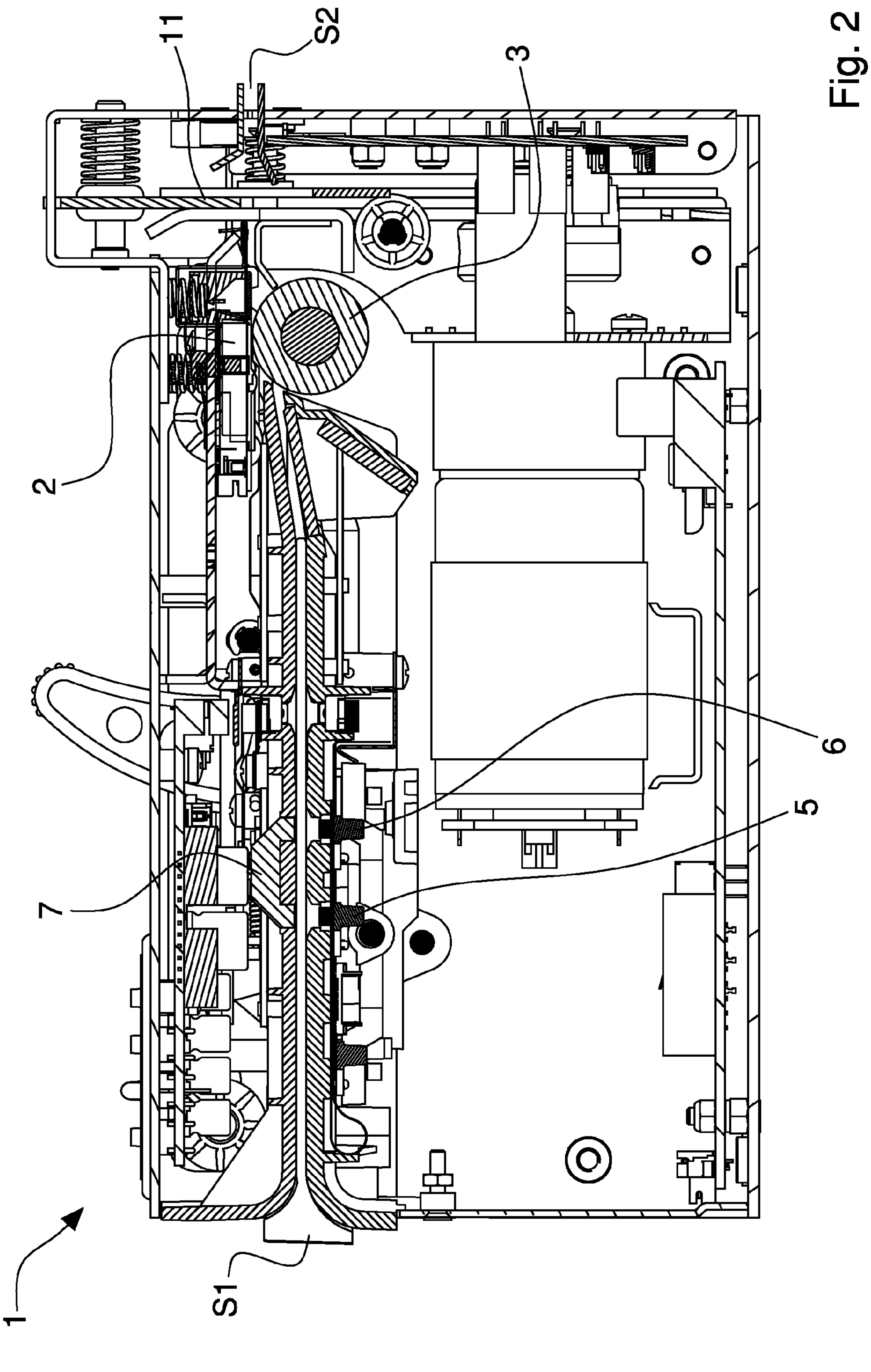
FIG. 2 is a section of a printer made according to the diagram in FIG. 1.

With reference to the aforesaid figures, with 1 a ticket printer has been indicated overall.

The printer 1 comprises an advancement path S along which a strip P of a printing support (for example a strip of paper or cardboard) is supplied in an advancement direction F. The printer has an inlet S1 for the printing support and an outlet S2 for the printed product (ticket). The advancement path S will extend between the inlet S1 and the outlet S2. The strip P may be a continuous strip having one or more holes H, or notches, or other types of zone through which a signal can pass, such as, for example, an optic signal, used for detecting an end of strip situation, as will be explained better below.

The strip P can be, in particular, a continuous printing support intended to be cut or torn transversely to form the printed tickets. The strip P can have the holes H, or notches, or the like, arranged at the cutting or tear lines for forming the tickets. Such holes H, or notches, or the like, may be made, for example, by die-cutting of the strip P, in the known manner.

With 2, a printing device for printing on the strip P that advances along the path S has been indicated, with 3, a dragging device for supplying the strip P along the advancement path S has been indicated, with 4 an end of strip sensor has been indicated. The printing device 2 may comprise any type of printing head that is usable, in particular, in a ticket printer. The dragging device 3 may comprise, for example, at least one strip-dragging roller.

The sensor 4 may comprise, as in the specific case, an optic sensor. The sensor 4 may comprise a signal emitter 5, a signal receiver 6 and a signal guide 7 operationally interposed between the emitter 5 and the receiver 6 to guide the signal emitted by the emitter 5 to the receiver 6 according to a set signal path.

The emitter 5 is arranged for emitting an (optic) signal directed to a first zone of the advancement path S in such a manner as to hit a first side of a strip P that advances along the path S.

The signal guide 7 operationally faces a second side, opposite the first side, of the strip P that advances along the path S. The signal guide 7 will be configured in particular for guiding the (optic) signal emitted by the emitter 5 along the signal path that goes from the aforesaid first zone to a second zone of the advancement path S that is situated at a distance from the first zone. This distance between the first zone and the second zone will have at least one component extending in a direction parallel to the advancement direction F of the strip P on the path S. The distance between the first zone and the second zone may be, in particular, parallel to the advancement direction F of the strip P along the path S.

The receiver 6 is arranged for receiving the (optic) signal that comes from the signal guide 7 and passes through the second zone of the path S.

The emitter 5 can be arranged before or after the receiver 6 along the advancement path S. The signal guide 7 is arranged on an opposite side of the advancement path S of the strip P with respect to a side where the emitter 5 and the receiver 6 are arranged.

The signal emitter 5 and receiver 6 may be, as in the specific example, of optic type. The signal guide 7 may comprise a light guide. In the specific case, the light guide comprises a body that is traversable by the optic signal to define the signal path. The body will have an inlet 8 facing the first zone and an outlet 9 facing the second zone. The body may comprise, as in the specific case, a monobloc made of transparent plastics and having two (shiny) external surfaces 10 reflecting internally, i.e. surfaces 10 that are able to reflect the optic signal that passes through the body. The surfaces 10 can be arranged tilted and facing one another in such a manner as to define a U-shaped (optic) signal path in which the inlet 8 and the outlet 9 are located at opposite ends of the U-shaped path.

The end of printing support sensor 4 will thus have an (optic) signal emitter 5 and receiver 6 arranged one after another in the advancement direction F of the printing support and operationally connected together via the signal guide 7, in which the emitter 5 and the receiver 6 will be arranged on a side of the path S of the printing support whereas the signal guide 7 will be arranged on the opposite side.

The printer may further comprise, as in the specific case, a cutting device 11 for cutting the strip P with transverse cuts in such a manner as to form printed tickets.

The printer may further comprise, as in the specific case, a control unit (not shown) to control the dragging device 3, the printing device 2 and the cutting device 11. The control unit will be connected to the sensor 4 and configured in such a manner as to recognise an end of strip situation if the signal emitted by the emitter 5 is received by the receiver 6. Substantially the end of strip situation will correspond to a situation in which both the first zone of the path S and the second zone (i.e. the path zones situated respectively between the emitter 5 and the inlet 8 of the signal guide 7 and between the receiver 6 and the outlet 9 of the signal guide 7) do not have obstacles that may prevent traversing of the signal from one side to the other of the path S. It should be observed that a strip P, that advances along the path S and is provided with a hole H (see FIG. 1), will not cause a false end of strip P signal, not even if the hole H affects the first or second zone of the path S. The dimensions of the hole H and the distance between the first and the second path zone S will be such as to prevent the hole H being able to interest the first and the second zone at the same time. Thus, whilst the hole H (or another empty support portion) passes in front, for example, of the first zone to permit the passage of the signal emitted by the emitter 5, a full supporting portion will be in front of the second zone to prevent the signal emitted by the emitter 5 and guided by the guide 7 as far as the second zone from reaching the receiver 6. Similarly, if an empty supporting portion (hole H) passes in front of the second zone, the signal emitted by the emitter 5 will not be able to reach the receiver 6, finding an obstacle in a full supporting portion arranged in front of the first zone. The positions of the holes H and the distance between the first and the second path zone S will be such as to prevent the two holes H being able to affect these zones simultaneously.

The first and the second zone of the path S will be arranged at a greater mutual distance (for example of at least 1 centimeter, or of at least 2 centimeters, or of at least 3 centimeters, or of at least 4 centimeters) which are decidedly greater than the empty portion (hole, notch, or the like) that a strip P that is usable as a printing support in a ticket printer can have.

The signal guide may comprise, as in the specific case, a transparent stiff body (for example made of plastics) with surfaces configured for reflecting (specularly) at least once the (optic) signal that traverses the body, or any other known type of signal guide, in particular light guide, such as, for example, an optic fibre.

The invention claimed is:

1. A ticket printer, comprising (a) an advancing path in which a continuous strip of a printing support containing one of holes, notches and areas with lower reflective capacity relative to other areas of the strip is supplied in an advancing direction;

(b) a cutting device for cutting the strip with transverse cuts in order to form printed tickets; and (c) a strip-end sensor comprising:

(1) an emitter arranged for emitting a signal directed to a first zone of said advancing path in order to strike a first side of a strip that advances in said path;

(2) a signal guide operationally facing a second side, opposite the first side, of a strip that advances in said path, said signal guide being configured for guiding the signal emitted by said emitter; and (3) a receiver arranged for receiving a signal that originates from said signal guide, wherein said signal guide is configured for guiding the signal along a signal path from said first zone to a second zone of said advancing path that is at a distance from said first zone, the distance between said first zone and said second zone having at least a component in said advancing direction, said receiver being arranged on an opposite part to said advancing path with respect to a part where said signal guide is arranged for receiving a signal that passes through said second zone in order to prevent a false end of paper signal due to the transit of one of a hole, a notch, and an area with lower reflective capacity relative to other areas of the strip in a detecting zone in which the strip-end sensor operates.

2. A ticket printer according to claim 1, wherein said signal emitter and said signal receiver are optical.

3. A ticket printer according to claim 1, wherein said signal guide comprises a light guide.

4. A ticket printer according to claim 3, wherein said light guide comprises a body that is traversable by an optical signal to define said signal path.

5. A ticket printer according to claim 4, wherein said body has an inlet facing said first zone and an outlet facing said second zone.

6. A ticket printer according to claim 4, wherein said body comprises a monobloc that is made of transparent plastics material and has two external surfaces that are internally reflecting.

7. A ticket printer according to claim 6, wherein said external surfaces are tilted and face one another to define a U-shaped signal path.

8. A ticket printer according to claim 7, wherein said inlet and said outlet are situated at opposite ends of the U-shaped path.

9. A ticket printer according to claim 1, and further comprising a control unit configured for recognising a strip-end situation when a signal emitted by said emitter is received by said receiver.

10. A ticket printer according to claim 1, wherein the distance between said first zone and said second zone is parallel to said advancing direction of the strip.

11. A ticket printer according to claim 1, and further comprising a dragging device for supplying the strip in said advancing path.

12. A ticket printer according to claim 1, and further comprising a printing device for printing on the strip that advances along said path.

* * * * *

UNITED STATES PATENT AND TRADEMARK OFFICE

CERTIFICATE OF CORRECTION

PATENT NO. : 8,971,786 B2
APPLICATION NO. : 13/979164
DATED : March 3, 2015
INVENTOR(S) : Alberto Campanini It is certified that error appears in the above-identified patent and that said Letters Patent is hereby corrected as shown below:

Title page, should read,

(73) Assignee: Custom S.p.A. (IT)

Signed and Sealed this
Eighth Day of December, 2015

Michelle K. Lee
*Director of the United States Patent and Trademark Office*